C. S. LOCKWOOD.
COMPOSITE ROLLER BEARING.
APPLICATION FILED JULY 11, 1918.

1,304,073.

Patented May 20, 1919.

Inventor:
Charles S. Lockwood,
per Thos. S. Crane, Atty.

UNITED STATES PATENT OFFICE.

CHARLES S. LOCKWOOD, OF NEWARK, NEW JERSEY, ASSIGNOR TO HYATT ROLLER BEARING DIVISION, UNITED MOTORS CORPORATION, OF HARRISON, NEW JERSEY, A CORPORATION OF NEW YORK.

COMPOSITE ROLLER-BEARING.

1,304,073.   Specification of Letters Patent.   Patented May 20, 1919.

Application filed July 11, 1918.   Serial No. 244,352.

*To all whom it may concern:*

Be it known that I, CHARLES S. LOCKWOOD, a citizen of the United States, residing at 496 Clinton avenue, Newark, county of Essex, and State of New Jersey, have invented certain new and useful Improvements in Composite Roller-Bearings, fully described and represented in the following specification and the accompanying drawings, forming a part of the same.

The object of this invention is to furnish a construction for a roller-bearing by which a series or set of rolls may be confined in a depressed cylindrical seat upon the hub of the bearing, and engaged permanently with such seat by a cage of suitable construction. The invention also includes a combination with such a seat and set of rolls, of a set of balls fitted to concave annular ball-races in the hub and casing of the bearing to resist end-thrust. The advantage of this construction is that the hub with all the moving parts attached thereto form a unitary assemblage which may be handled entirely apart from the casing, and thus permit the casing, as is common in many machine constructions, to be inserted in a socket in the frame of a machine, and a hub afterward inserted with the rolls and with a shaft to which the hub is attached.

In my construction the annular ball-race is smaller than the roll-seat upon the hub, and the casing has an inner collar at one end forming a ball-seat which has a lip overhanging the outer sides of the balls to receive and transmit end-thrust.

The opposite end of the casing is open so that the hub, with the assembled rolls and balls, can be inserted or removed from the same.

Figure 1:
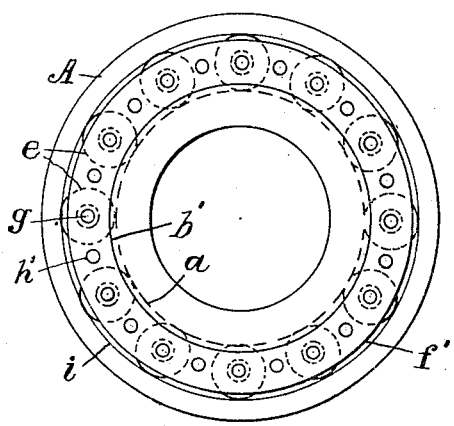
Figure 3:
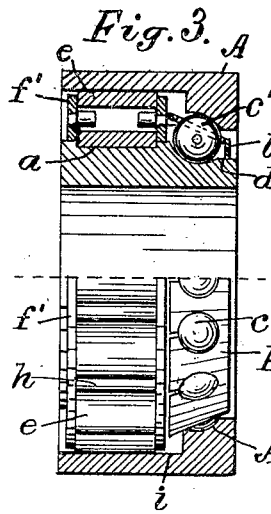
Figure 2:
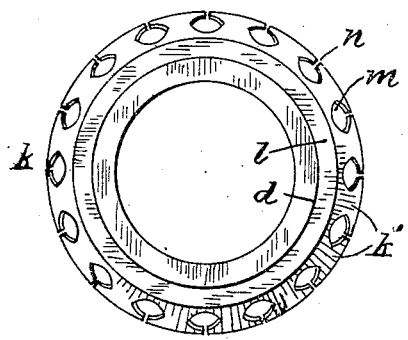
Figure 4:
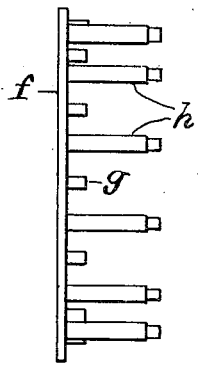
Figure 5:
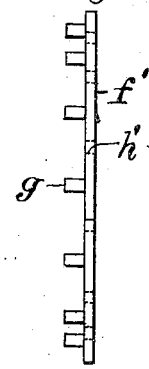
Figure 6:
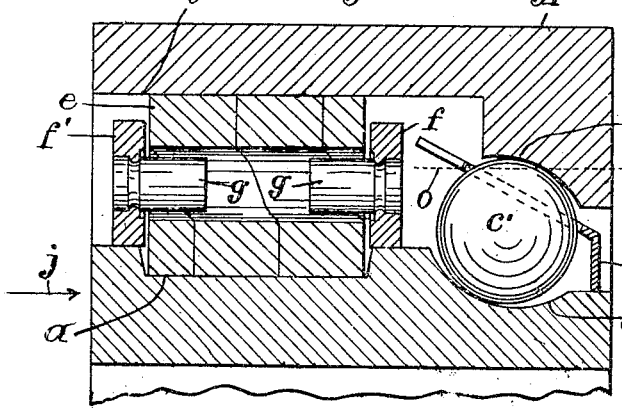

This construction will be understood by reference to the annexed drawing, in which Figure 1 shows one end of a roller-bearing exhibiting the cylindrical rolls fitted to a depressed seat upon the hub; Fig. 2 shows the cage for the balls at the opposite end of the hub; Fig. 3, in the upper half, shows a central section of the bearing of Fig. 1, the lower half showing the casing only in section; Fig. 4 shows one head of the cage with studs and tie-bars secured thereto; Fig. 5 shows the other head of the cage with studs thereon; Fig. 6 is an enlarged section of the parts shown in the upper half of Fig. 3; and Fig. 7 is a side-view of the hub.

Figure 7:
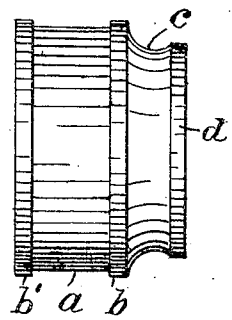

The hub, as shown in Figs. 6 and 7, is formed at one end with a cylindrical seat $a$ having flanges $b$, $b'$ at its edges thus producing a depressed cylindrical raceway, and is formed at the opposite end with an annular concave groove $c$ forming a depressed ball-race or seat in which the balls $c'$ have but slight movement longitudinally of the hub, as the outer rim $d$ of the groove is larger than the bottom of the groove so that the balls cannot pass over it when embraced by their cage.

The flange $b$ forms the inner rim of the groove and is elevated above the outer edge of the rim $d$ to afford sufficient bearing-surface to resist end-thrust, which the bearing is designed to sustain in only one direction.

In Fig. 6, a hollow roll $e$ is shown fitted into the depressed cylindrical raceway $a$ and the rolls are confined upon the hub to prevent any escape from the raceway, by a cage having heads $f$, $f'$, carrying studs $g$ which project within the bore of the roll at opposite ends.

The heads of the cage, as shown in Figs. 3 to 5 inclusive, are connected by tie-bars $h$ the ends of which are shown, (as in practice), shouldered down to fit holes in the heads intermediate to the studs $g$. The rolls are shown with cylindrical bore and the studs are also made cylindrical and furnish, when fitted to the bores of the rolls, a large bearing-surface which prevents any appreciable or injurious wear.

Before assembling the parts upon the hub, the head $f$ of the cage has the studs and tie-bars secured thereto by riveting. In assembling these parts, the rolls are first placed in the depressed cylindrical raceway $a$ and the heads of the cage are then slipped over the opposite ends of the hub and fitted loosely upon the flanges $b$, $b'$, the studs $g$ then entering the bores of the rolls and the ends of the tie-bars fitting within the holes $h'$ in the head $f'$. (See Fig. 1.) The riveting of these ends in the said holes then serves to secure the cage upon the rolls and to hold the rolls permanently secured upon the hub so as to form therewith a unitary assemblage which can be handled apart from the casing.

The casing A is formed in one end with a cylindrical seat $i$ embracing the outer sides of the rolls $e$, and in the other end with an integral collar having an inwardly extending lip upon its outer side forming a concave ball-race $A'$ fitted to the balls upon the outer quarter of their surface. The parts are so proportioned that any movement of the hub in the direction of the arrow $j$, in Fig. 6, is resisted by the contact of the balls with the outside lip of the raceway. The bearing is thus designed especially to resist end-thrust in one direction.

To hold the balls in place upon the hub when the casing is removed and thus facilitate the assembling of the parts and their manipulation apart from the casing, a conical cage $k$ is formed of sheet-metal with a flange $l$ upon its smaller end to turn upon the hub $d$, on the outer side of the groove $c$.

The vertical shell of the cage is formed with a hole $m$ for each of the balls and embraces only the outer segment of the ball, as shown in Figs. 3 and 6.

A slit $n$ is extended from the larger end of the cage into each of the holes, so that the tongue $k'$ between the slits may be free to spring outwardly. This permits the cage to be slipped over the entire series of balls at once when they are in the groove $c$, the conical form of the cage holding the inner end of each hole in the cage nearly at the highest point upon the ball; so that a limited amount of bending is required of each tongue. This will be apparent from the dotted line $o$, $o$, in Fig. 6, which is extended below the top of the ball to a level with the higher edge of the hole, showing the amount that the tongues $k'$ would have to yield in crowding over the top of the ball.

When the balls are held in their ball-races by the conical cage, they are prevented by the flange $b$ and rim $d$ from moving endwise upon the hub, and the balls and rolls, with the hub, can thus be handled as a unit, and the loss of any of the balls wholly prevented in handling these parts after they are assembled, before the casing is applied thereto.

It will be observed in Figs. 3 and 6 that the casing is shown open at the left-hand end, and that the hub with the rolls and balls assembled thereon can therefore be pushed inside the cylindrical seat $i$ until the balls are arrested by contact with the ball-seat $A'$. The casing can therefore be located at any accessible point upon a machine-frame and a shaft, with the hub attached, inserted through the casing to bring the parts of the roller-bearing into working relation to one another.

It will be noticed in Fig. 6, which shows the details of construction more clearly than Fig. 3, that the inner sides of the flanges $b$ and $b'$ are sloped outwardly so that the flat surfaces upon the ends of the rolls do not make any contact with the flanges, but the extreme corners only of the rolls, thus reducing the friction of such contact in a great degree.

The beveling of these flanges also prevents the rolls from pinching or cramping in the raceway if one end of the roll is by any means advanced a little farther than the other.

The studs are proportioned to the bore of the rolls and so located in the rolls that the clearance between the stud and the lower side of the bore is materially less than the height of the flanges $b$, $b'$, so that the engagement of the cage with the rolls prevents the rolls positively from escaping from the raceway between the flanges.

It will be noticed that there will be no tendency whatever in the operation of the bearing to crowd the cylindrical rolls endwise, and there is therefore no appreciable wear upon the ends of these rolls.

It will also be understood that two such bearings as are shown in Fig. 3 can be placed in reverse positions in the opposite ends of a wheel-hub, and thus resist end-thrust upon the hub in both directions.

I do not claim the mere combination of a hub with rolls or balls in a unitary structure, but the particular construction described herein which furnishes means of resisting lateral and end-thrust by the use of very few parts, connected together in such manner that everything within the casing can be withdrawn as a unitary structure, and re-inserted therewith in connection with a shaft upon which the hub would be carried or to which it would be secured.

Having thus set forth the nature of the invention what is claimed herein is:

1. In a roller bearing, a hub having upon one end a depressed cylindrical roll-seat with flanges at the edges and upon the other end a depressed concave raceway forming a ball-seat smaller in diameter than the cylindrical roll-seat, the flanges of the roll-seat being sloped outwardly to avoid contact with the ends of rolls and the said ball-seat having its outer rim elevated above the ball-seat, substantially as set forth.

2. In a roller bearing, the combination, with a hub having upon one end a cylindrical roll-seat with flanges at the edges, of a series of cylindrical rolls fitted to such roll-seat and the other end of the hub having a concave raceway forming a ball-seat with a series of balls fitted thereto, separate cages operated to hold the rolls and balls upon their respective seats, a casing having cylindrical bore with an inner collar at one end having a concave ball-seat therein smaller than the bore of the casing fitted to the said balls, with a lip overhanging the outer quarter of the balls, the whole arranged and operated substantially as set forth.

In testimony whereof I have hereunto set my hand.

CHARLES S. LOCKWOOD.